United States Patent
Nakanishi et al.

[19]

[11] Patent Number: 6,054,840
[45] Date of Patent: Apr. 25, 2000

[54] POWER SUPPLY DEVICE

[75] Inventors: Toshiaki Nakanishi; Yuji Torii, both of Toyohashi, Japan

[73] Assignee: Matsushita Electric Industrial Co., Ltd., Osaka-fu, Japan

[21] Appl. No.: 09/171,731

[22] PCT Filed: Feb. 23, 1998

[86] PCT No.: PCT/JP98/00743

§ 371 Date: Feb. 10, 1999

§ 102(e) Date: Feb. 10, 1999

[87] PCT Pub. No.: WO98/38721

PCT Pub. Date: Sep. 3, 1998

[30] Foreign Application Priority Data

Feb. 25, 1997 [JP] Japan .................................. 9-040411
Dec. 5, 1997 [JP] Japan .................................. 9-335333

[51] Int. Cl.[7] .................................................. H01M 10/46
[52] U.S. Cl. .......................................................... 320/118
[58] Field of Search .................................. 320/116, 118, 320/119, 127, 128, 134, 136, 137

[56] References Cited

FOREIGN PATENT DOCUMENTS

| 5-336675 | 12/1993 | Japan . |
|---|---|---|
| 6-60910 | 3/1994 | Japan . |
| 6-105475 | 4/1994 | Japan . |
| 6-133465 | 5/1994 | Japan . |
| 06231805 | 8/1994 | Japan . |
| 6-233468 | 8/1994 | Japan . |
| 7-143680 | 6/1995 | Japan . |
| 7-231571 | 8/1995 | Japan . |
| 8-140209 | 5/1996 | Japan . |
| 8-182211 | 7/1996 | Japan . |
| 8-223812 | 8/1996 | Japan . |

*Primary Examiner*—Edward H. Tso
*Attorney, Agent, or Firm*—Akin, Gump, Strauss, Hauer & Feld, L.L.P.

[57] ABSTRACT

The present invention relates to a power supply apparatus, more particularly to an improvement of a power supply apparatus provided with a plurality of secondary batteries connected serially, as well as a control of charging and discharging of the secondary batteries to suppress an accelerative deterioration of the secondary battery. The present invention provides to a control unit with a function for stopping the charging when the charged amount in charging becomes larger than the predetermined value, another function for changing the initial set value to a larger value when a variance in the charging capacity among the secondary batteries in charging becomes larger than the predetermined value.

10 Claims, 4 Drawing Sheets

POWER SUPPLY DEVICE

TECHNICAL FIELD

The present invention relates to a power supply apparatus, particularly to a power supply apparatus comprising a plurality of secondary batteries connected serially, and more concretely to a control of charging and discharging in such power supply apparatus, to eliminate a variance in capacity among the batteries and to prevent an accelerative deterioration of the batteries.

BACKGROUND ART

Various power supply apparatuses in which many secondary batteries such as alkaline secondary batteries and nickel-metal hydride secondary batteries are connected serially have been proposed. Such power supply apparatuses are now attracting a great deal of attention especially as driving power sources of electric vehicles. Since a high voltage of 200–300 V is required as a driving power source of an electric vehicle, each of such power supply apparatuses is provided with a battery unit including about 200 secondary batteries connected serially. In such a power supply apparatus, the battery unit is charged by an external power source and discharged to an external load such as a motor. Usually, the electrical power unit is provided with monitor and control means for monitoring a state of each battery to prevent both overcharging and overdischarging. The monitor and control means stops the charging when the battery unit voltage reaches a predetermined upper limit thereby to prevent overcharging in charging, and the monitor and control means stops the discharging when the battery unit voltage drops to a predetermined lower limit thereby to prevent overdischarging in discharging.

Regardless of the battery type, a deterioration of a secondary battery including a decrease in battery capacity and an increase in internal resistance thereof progresses acceleratively as charge/discharge cycles are repeated. Further, if many secondary batteries are used, the deterioration of battery badly affects other batteries. According to the control as described above, for example, a secondary battery whose capacity is reduced due to the deterioration is further deteriorated since it is apt to be overdischarged. In addition, heat due to the increase in internal resistance of the secondary battery causes a drop in output or deterioration of other secondary batteries. Also a normal secondary battery deteriorates and generates heat thereby increasing the surrounding temperature and even when charged fully, may be overcharged, if the charging efficiency of the secondary battery around it drops.

If many batteries are to be used, a temperature difference among batteries, for example, causes the deterioration of batteries. In addition to the facilitation of the deterioration due to high temperature, a difference in charging efficiency or self-discharge characteristics among the batteries caused by a temperature difference also causes the overcharging or the overdischarging of the batteries. Further, even when every secondary battery is used under the same condition, a difference in original characteristics among respective batteries such as capacity, charging efficiency and self-discharging characteristics also becomes a factor is the deterioration.

Therefore, various means to suppress such accelerative deterioration in battery characteristics have been proposed. For example, the Official Gazette of Unexamined Japanese Patent Publication No. Hei 6-231805 has proposed a method in which a voltage of a battery unit composed of a plurality of batteries connected serially is monitored and a voltage of each battery is also monitored, then a charge upper limit voltage is corrected to be lower and a discharge lower limit voltage is corrected to be higher when a variance in battery voltage becomes large.

As shown in FIG. 4, a power supply apparatus 30 comprises a battery unit 32 for supplying an electric power to a load 33 such as a motor, and control and monitor means 34 for controlling and monitoring the battery unit 32.

A charging operation of the power supply apparatus proposed in the above-mentioned gazette will be explained with reference to a flow chart shown in FIG. 5. In charging, the monitor and control means 34 controls charging of the battery unit 32 performed by a power source 31 according to a state of the battery unit 32 while monitoring the state of the battery unit 32. When the charging is started, the monitor and control means 34 makes the power source 31 supply a current to the battery unit 32 while monitoring a voltage of each battery included in the battery unit 32. In step 301, the monitor and control means 34 compares the variance ($\sigma_0$) in voltage among the batteries with a preset value ($D_0$). At this time, if the $\sigma_0$ is smaller than the $D_0$, the monitor and control means 34 judges the battery unit 32 is being normal and keeps the supply of current from the power source 31 to the battery unit 32 until the charged amount (C) of the battery unit 32 reaches a predetermined upper limit capacity ($C_u$) (in step 302). On the other hand, if the $\sigma_0$ is not smaller than the $D_0$, the monitor and control means 34 changes the charging amount used to stop charging from $C_u$ to a corrected upper limit capacity ($C_{uc}$) which is smaller than $C_u$ (in step 303). At this time, the battery unit 32 is charged up to the $C_{uc}$, then the charging is finished.

According to this method, the accelerative deterioration of the battery can be prevented, but this method includes a problem wherein the full performance of the battery is not brought out since batteries with no deterioration are not charged fully.

Next, a discharging operation of this power supply apparatus will be described with reference to a flow chart in FIG. 6. When discharging is started, the monitor and control means 34 supplies an electric power from the battery unit 32 to the load 33 while monitoring a voltage of each battery. At this time, it compares a variation ($\sigma_1$) in the voltage among batteries with a preset value ($D_1$) in step 401. If the $\sigma_1$ is smaller than the $D_1$, the monitor and control means 34 judges the battery unit 32 as being normal and keeps the battery unit 32 discharged to the lower limit capacity ($C_1$) that is the original discharging lower limit (step 402), then stops the discharging. If the $\sigma_1$ is over the $D_1$, however, the monitor and control means 34 changes the capacity value at which the discharging is stopped from the $C_1$ to a corrected lower limit capacity ($C_{1c}$) which is larger than the $C_1$ (in step 403). And accordingly, the battery unit 32 is discharged to $C_{1c}$ and the discharging is finished.

According to this method, it is possible to prevent an accelerative deterioration of batteries as same in a charging operation, but it is impossible to carry out the full performance of the battery. In addition, since it is impossible to eliminate a memory effect of a battery whose performance has dropped, the variance in capacity among the batteries cannot be eliminated substantially.

DISCLOSURE OF INVENTION

The object of the present invention is to solve the above-mentioned problems and to provide a power supply apparatus which can bring out a full performance of a battery as well as eliminating an accelerative deterioration of the battery.

A power supply apparatus of the present invention includes a battery unit for supplying an electric power to a load, and a control unit for stopping charging if the charged amount of the battery unit becomes higher than a preset value, wherein the battery unit comprises a plurality of batteries connected serially, and the control unit has a function for changing the preset value of the charging amount of the battery unit to a larger value if a variance in charging capacity among the secondary batteries becomes large in charging.

By increasing the charging amount, a battery which is insufficiently charged due to decline in charging characteristics is brought into the almost full-charged state because of the further charging. Thus, the variance in capacity among the batteries is corrected. Further, since each normal battery is charged sufficiently, the full capacity of the battery unit can be brought out. Consequently, it is also possible to prevent a sharp drop of an output voltage of the power supply apparatus due to the decrease in charging amount of each batteries. Therefore, it becomes possible to provide a highly reliable power supply apparatus which can stably supply an electric power.

In such a case, a rise in inner pressure of each battery in charging can be suppressed if the charging rate is set to 0.3 C or lower. Especially, when the object secondary battery is a nickel-metal hydride storage battery, a significant effect can be obtained since monitoring the state of the battery becomes easy.

Another power supply apparatus of the present invention includes a battery unit for supplying an electric power to a load, and a control unit for stopping discharging if the discharged amount of the battery unit becomes larger than a preset value, wherein the battery unit comprises a plurality of secondary batteries connected serially, and the control unit comprises a function for changing the preset value of the discharging amount of the battery unit to a larger value if a variance in remaining capacity among the secondary batteries in discharging becomes large.

In discharging, if the variance in remaining capacity increases, the discharge lower limit voltage is made lower. Consequently, the memory effect is eliminated from the battery whose capacity has dropped, so that the capacity is restored. Therefore, it becomes possible to carry out the full performance of the battery.

The preset value of such charging or discharging amount is changed when the variance monitored by the control unit becomes higher than a predetermined value.

In the same way, it is also effective to change the preset value when the number of charging or discharging cycles reaches a predetermined count decided by considering the cycle life of each battery.

In addition, it is further effective to change the preset value in the same way when the battery unit is left in a state of being fully charged or discharged for a predetermined period or longer.

The charging capacity or remaining capacity described above can be known by measuring the voltage of the object battery without measuring it directly.

As described above, according to the present invention, the heat or deterioration in charging or discharging of the battery can be suppressed since the variance in capacity among batteries can be suppressed. Therefore, the present invention can significantly improve due reliability of a power supply apparatus. The effect of the present invention will be more marked especially when the power supply apparatus is used for an electric vehicle or the like which needs an output with large capacity.

BEST MODE FOR CARRYING OUT THE PRESENT INVENTION

Figure 1:
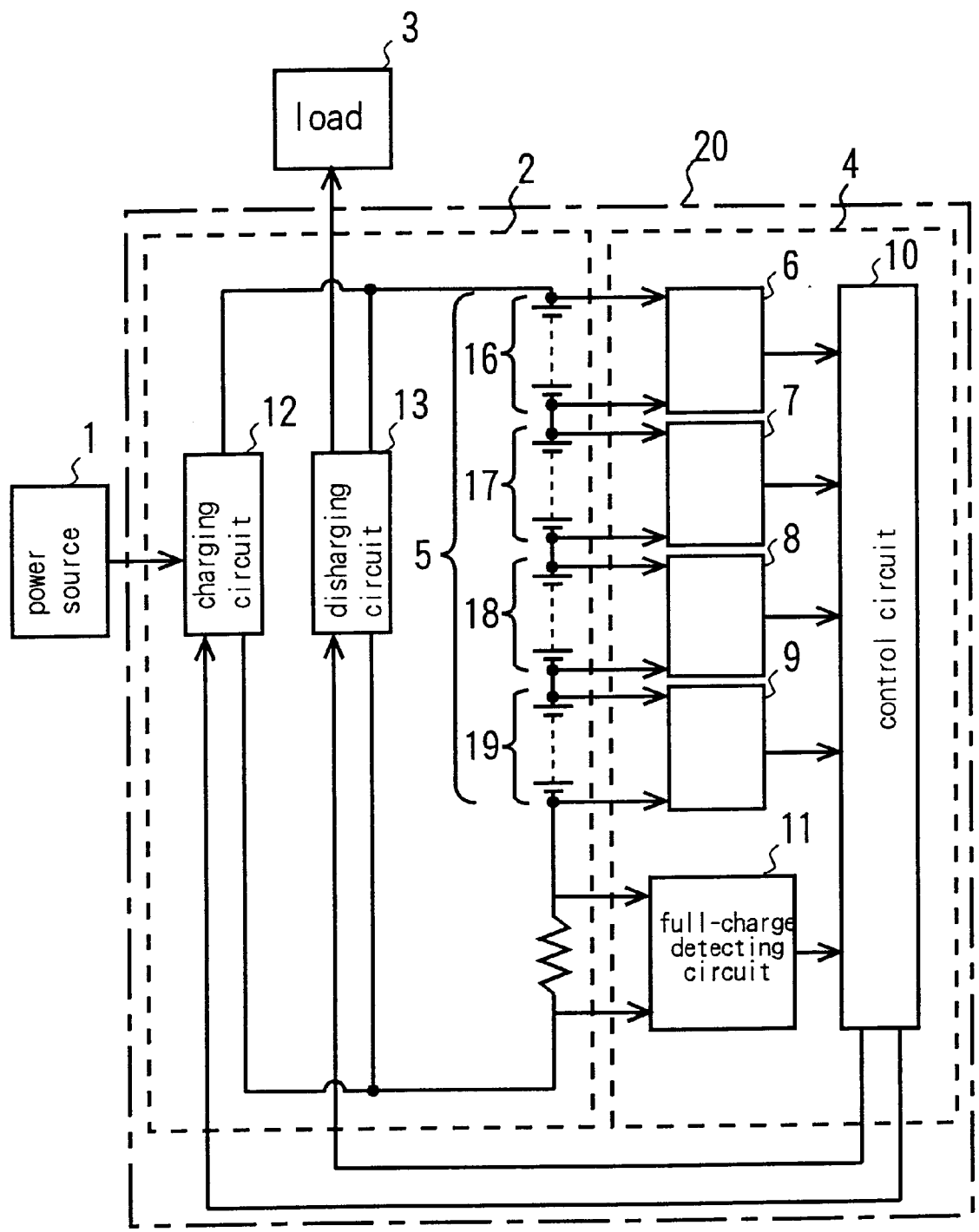
FIG. 1 is a block diagram showing a configuration of a power supply apparatus in an embodiment of the present invention.

A preferred embodiment of a power supply apparatus of the present invention are shown in FIG. 1. A power supply apparatus 20 includes a battery unit 2 as an output source and a control unit 4 for monitoring and controlling a charging and discharging of a battery unit 2. The battery unit 2 stores an electric power supplied from a power source 1 and supplies it to a load 3. For example, if this power supply apparatus is employed as a driving power source for an electric vehicle, the load 3 is a motor.

The battery unit 2 includes a plurality of secondary batteries 5 connected serially, and a charging circuit 12 and a discharging circuit 13 for control charging and discharging of the secondary batteries 5, respectively. As the secondary batteries 5, for example, nickel-metal hydride secondary batteries, alkaline secondary batteries or lead acid secondary batteries are employed. In the battery unit 2, the secondary batteries 5 are divided into groups each includes a fixed number of them connected serially, thereby forming a plurality of units 16–19.

The control unit 4 includes voltage detecting circuits 6–9 for detecting voltages of the units 16–19, respectively, and a full-charge detecting circuit 11 for detecting the total voltage of the secondary batteries 5. The control unit 4 further includes a control circuit 10 for outputting control signals to the charging circuit 12 and discharging circuit 13 based on the signals detected by the voltage detecting circuits 6–9 and full-charge detecting circuit 11.

Hereunder, preferred embodiments of the present invention will be described in detail with reference to the accompanying drawings.

Embodiment 1

In this embodiment, an operation of the above-mentioned power supply apparatus at charging will be described.

Figure 2:
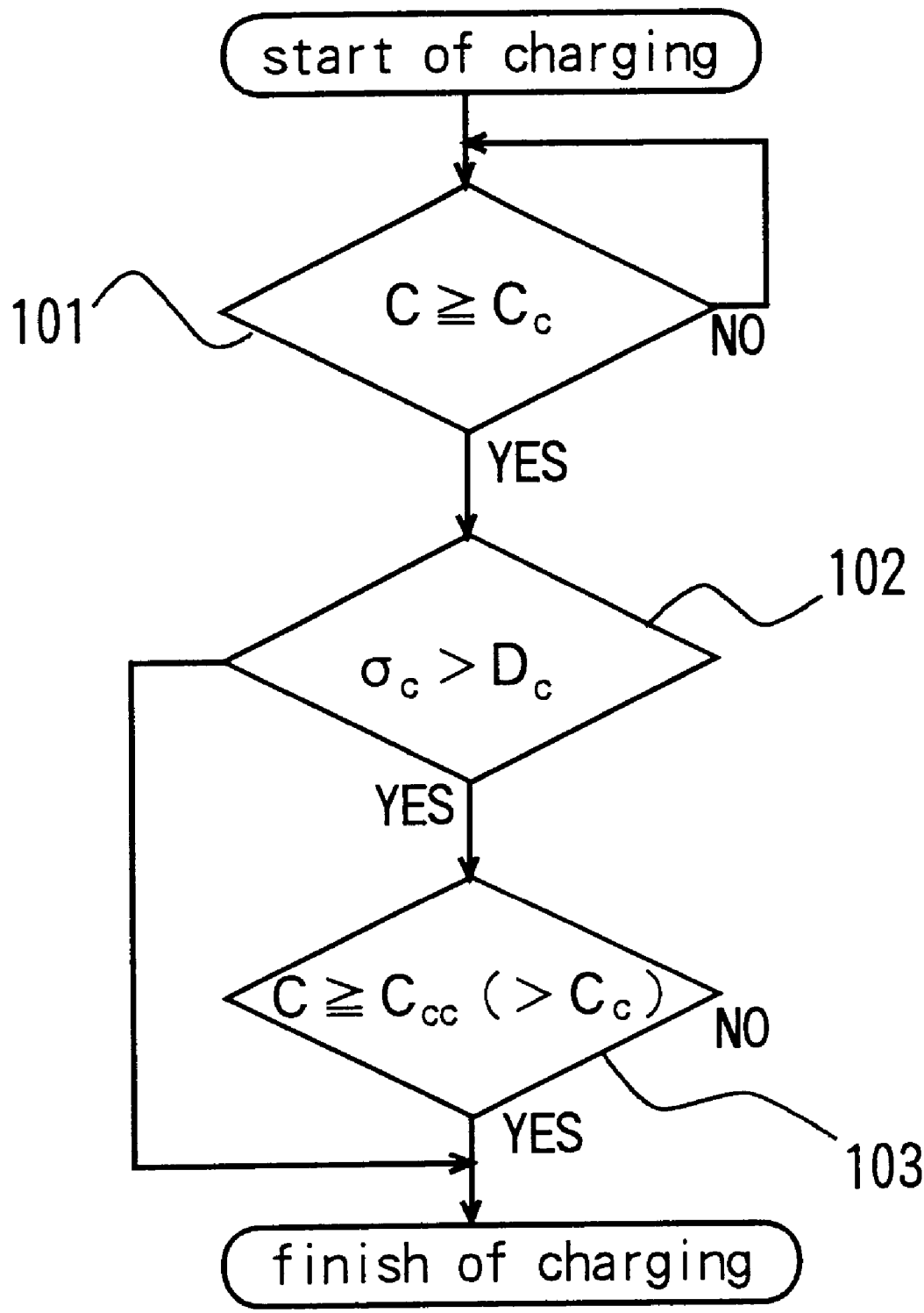
FIG. 2 is a flow chart indicating a charging control of the same power supply apparatus.

An operation for controlling a charging will be explained using a flow chart shown in FIG. 2.

When a current supplied from the power source 1 to the battery unit 2 and the charging is started, the full-charge detecting circuit 11 detects the total voltage of the secondary batteries 5 and judges whether the secondary batteries 5 are charged up to the upper limit capacity or a normal full-charging value based on the detected value.

In step 101, the full-charging detecting circuit 11 compares the total charged amount (C) of the secondary batteries 5 with the upper limit capacity ($C_c$) and if the C does not reach the $C_c$ value yet, the full-charge detecting circuit 11 continues charging.

When the C value reaches the $C_c$ value, each of the voltage detecting circuits 6–9 detects the charged amount of the corresponding unit and outputs a signal to the control circuit 10 based on the detected value. The control circuit 10 compares the signals from the voltage detecting circuits 6–9 to calculate a variance (e.g., standard deviation) in voltage among the units. The control circuit 10 further compares the variance ($\sigma_c$) in voltage among the units 16–19 with a preset value $D_c$. If the $\sigma_c$ value is the $D_c$ value or lower, the control circuit 10 judges that normal charging occurred and outputs a signal for finishing the charging to the charging circuit 12. The charging is thus finished normally. However, if the $\sigma_c$ value is over the $D_c$ value, the control circuit 10 replaces the $C_c$ with a corrected upper limit capacity ($C_{cc}$) which is larger than the $C_c$ and continues the charging. If the control circuit 10 judges the C value to be reached to $C_{cc}$, the charging is finished.

That is, the battery which is not fully charged due to a low charging efficiency thereof is further charged thereby to be brought into a nearly full-charged state. In such a manner, the variance in charging capacity among batteries can thus be minimized, and the full performance of the battery can be brought out, although a larger capacity battery are closely overcharged in comparison with a smaller capacity battery.

The charging rate should preferably be 0.3 C or lower in order to suppress a raise in pressure of the battery.

Although the corrected upper limit capacity $C_{cc}$ is set larger by 30% than the upper limit capacity $C_c$ in the above embodiment, setting $C_{cc}$ larger may cause overcharge. On the other hand, if the $C_{cc}$ is set smaller than the value, however, the above effect is lessened.

Embodiment 2

In this embodiment, controlling the discharging of the same power supply apparatus will be described.

Figure 3:
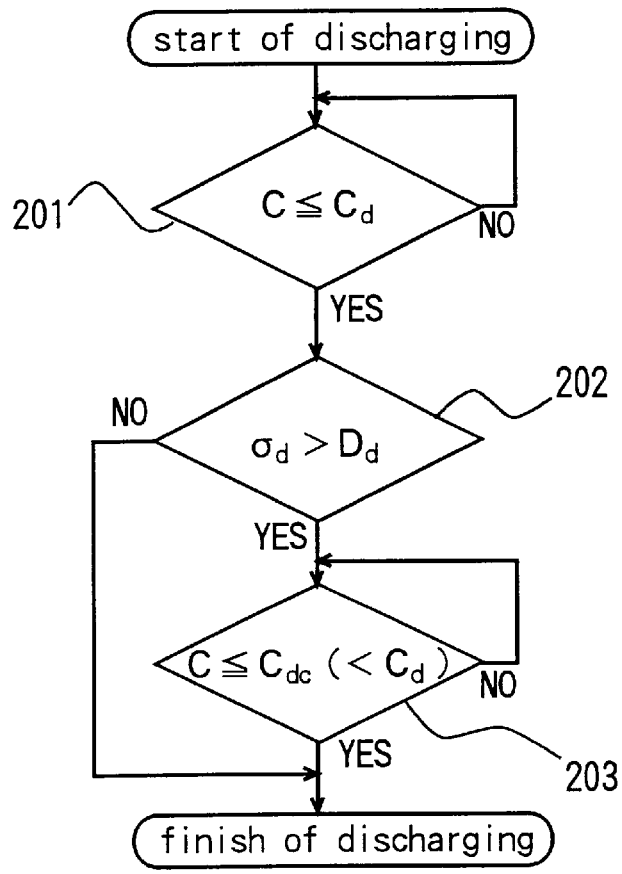
FIG. 3 is a flow chart indicating a discharging control of the same power supply apparatus.
Figure 4:
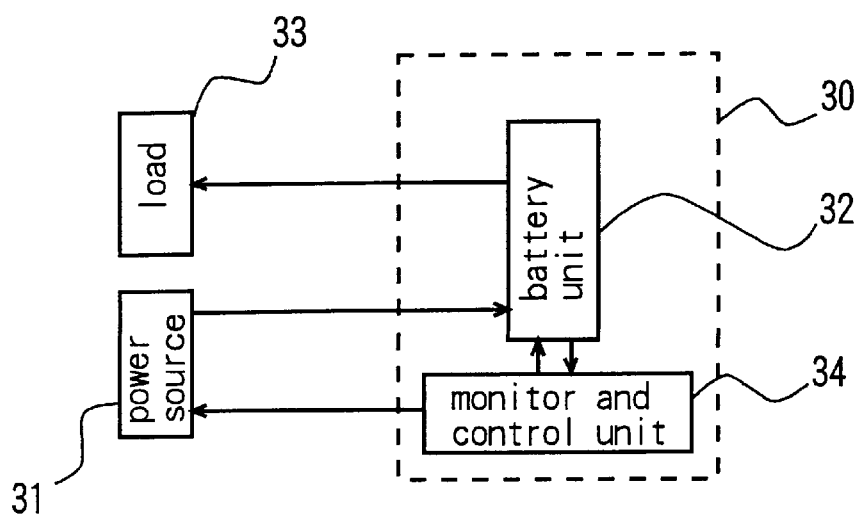
FIG. 4 is a block diagram for a configuration of a prior art power supply apparatus.
Figure 5:
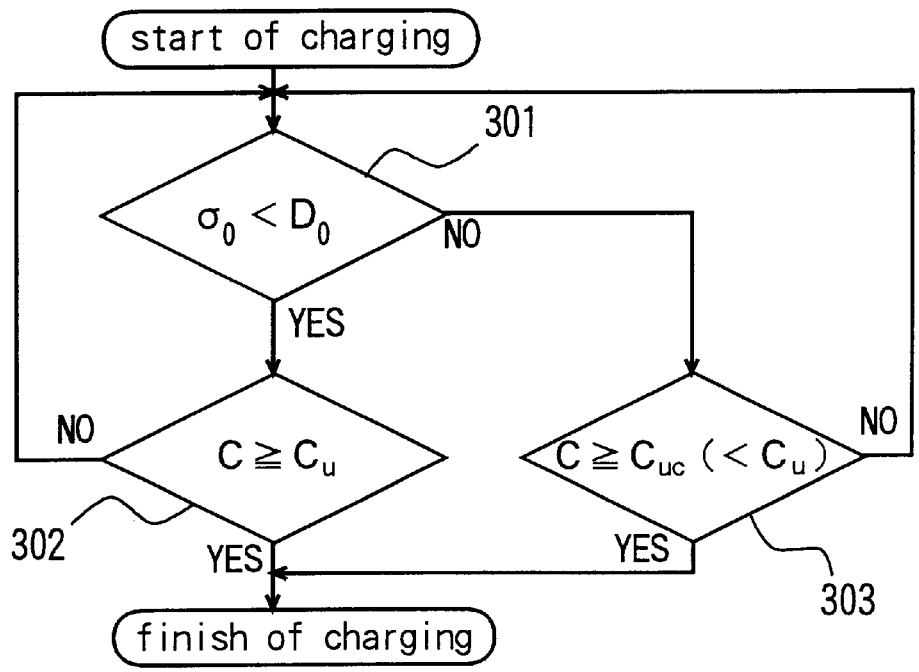
FIG. 5 is a flow chart indicating a charging control of the same power supply apparatus.
Figure 6:
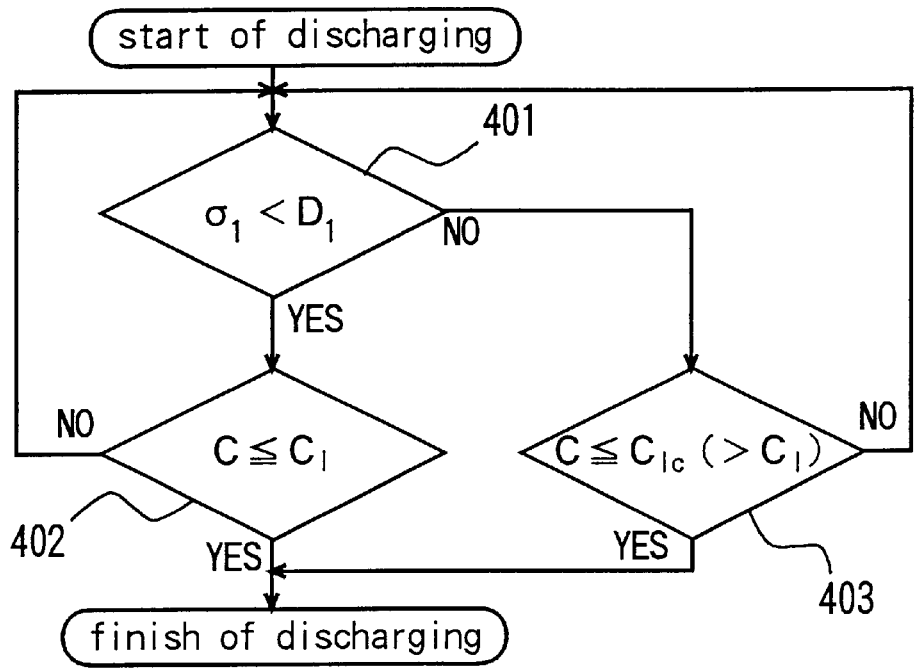
FIG. 6 is a flow chart indicating a discharging control of the same power supply apparatus.

An operation for controlling discharging of the power supply apparatus will be described with reference to a flow chart shown in FIG. 3. During discharging, the control unit 4 begins detecting of the total voltage of the secondary batteries 5. In step 201, the control unit 4 continues discharging of the secondary batteries 5 until the total voltage of the secondary batteries 5 drops to a preset cut-off voltage. The charged amount of the secondary batteries 5 at this time is assumed as a lower limit capacity ($C_d$). In step 202, the control circuit 10 compares a variance ($\sigma_d$) of the voltages of the units 16–19 detected by the voltage detecting circuits 6–9 with a preset value ($D_d$). If the $\sigma_d$ value is within the $D_d$ value, the control circuit 10 judges the discharging to be done normally and outputs a signal for finishing the discharging to the discharging circuit 13. The discharging is thus finished normally. If the $\sigma_d$ value is over the $D_d$ value, however, it replaces the lower limit capacity ($C_d$) with a smaller corrected lower limit capacity ($C_{dc}$) and continues the discharging. The discharging is finished after discharging until the total charged amount of the secondary batteries 5 drops to the $C_{dc}$ value.

It is thus possible to eliminate the memory effect and bring out the full capacity of each secondary battery as described above by setting the cut-off voltage lower when the battery is deteriorated, then discharging.

Although a method for charging in which the upper limit capacity are changed and a method in which the lower limit capacity is changed in discharging are described separately in the above embodiments, those methods may be combined.

It is not necessary to execute the above operation continuously. After one correction of the charging or discharging, the variance in capacity among batteries will almost be eliminated.

The method for charging or discharging in which the upper limit capacity or lower limit capacity is changed while continuously monitoring a variance in capacity among the batteries are described in the above embodiments, but it is not necessary to always check the capacity and it may be possible to change the upper limit or the lower limit as same as above when the predetermined number of the charge/discharge cycle is counted employing a control unit provided with a counter for counting the charge/discharge cycles.

It may be also possible to set in the control circuit a time period in which the variance in capacity is expected to become large and to change the preset value as same as above after the period is passed. At this time, if the set period is decided by taking the battery temperature into consideration, for example, the variance in capacity can be suppressed more effectively. For example, if the battery unit is disposed under a high temperature or if the temperature in the battery unit differs among batteries, the set period should be shortened.

Although a voltage is detected from each unit composed of a plurality of batteries in the above embodiment, the voltage detecting circuit can be provided with each of those batteries. Of course, the number of voltage detecting circuits, as well as the number of batteries in each unit are not limited only to those described in the above embodiment.

Industrial Applicability

Since the present invention can improve the reliability of a power supply apparatus, it can also apply to any of general-purpose power supply apparatuses. Especially, the present invention will be useful when used as a driving power source for an electric vehicle that needs a large power capacity.

What is claimed is:

1. A power supply apparatus including a battery unit for supplying an electric power to a load, and a control unit for stopping charging if the charged amount of said battery unit becomes higher than a preset value, wherein said battery unit comprises a plurality of secondary batteries connected serially, and said control unit has a function for changing said preset value of the charging amount of said battery unit to a larger value when a variance in charging capacity among said secondary batteries becomes large in charging.

2. The power supply apparatus in accordance with claim 1, wherein the charging rate in the charging is 0.3 C or lower.

3. The power supply apparatus in accordance with claim 1, wherein said control unit further comprises a function for monitoring the charging capacity of said secondary battery in charging, and changing said preset value of the charged amount of the battery unit when the variance in the detected charging capacity becomes larger than a predetermined value.

4. The power supply apparatus in accordance with claim 1, wherein said preset value of the charging amount of the battery unit is changed when the number of charge/discharge cycles of said battery unit reaches a predetermined count.

5. The power supply apparatus in accordance with claim 1, wherein said preset value of the charging amount of the battery unit is changed when the charging is operated a predetermined time after the last discharging.

6. The power supply apparatus in accordance with claim 1, wherein said control unit further has a function for stopping discharging when the discharged amount of said battery unit becomes larger than a preset value, and a function for changing said preset value of discharging amount of the battery unit to a larger value when a variance in remaining capacity among said second batteries in discharging becomes large.

7. A power supply apparatus including a battery unit for supplying an electric power to a load, and a control unit for stopping discharging when the discharged amount of said battery unit becomes larger than a preset value, wherein said battery unit comprises a plurality of secondary batteries connected serially, and said control unit comprises a function for changing said preset value of discharging amount of the battery unit to a larger value to continued discharging when a variance in remaining capacity among said second batteries in discharging becomes large.

8. A power supply apparatus in accordance with claim 7, wherein said control unit further comprises a function for monitoring said remaining capacity of the secondary batteries in discharging, and said preset value of discharging amount of the battery unit is changed when a variance in the detected remaining capacity becomes larger than a predetermined value.

9. The power supply apparatus in accordance with claim 7, wherein said preset value of the discharging amount of the battery unit is changed when the number of charge/discharge cycles of said battery unit reaches a predetermined count.

10. The power supply apparatus in accordance with claim 7, wherein said preset value of the discharging amount of the battery unit is changed when the discharging is operated a predetermined time after the last discharging.

* * * * *